United States Patent

Hanson

[15] 3,653,337
[45] Apr. 4, 1972

[54] FOOD COOKING APPARATUS

[72] Inventor: Roger H. Hanson, 808 47th Street South, Great Falls, Mont. 59401

[22] Filed: Feb. 26, 1970

[21] Appl. No.: 14,340

Related U.S. Application Data

[63] Continuation-in-part of Ser. No. 659,634, Aug. 10, 1967, abandoned.

[52] U.S. Cl. ............................... 425/394, 99/426, 425/412, 425/452
[51] Int. Cl. .......................................................... A23p 1/00
[58] Field of Search .......................... 99/426, 430, 432, 428; 107/1 A, 19 R, 19 A, 8 R, 8 C

[56] References Cited

UNITED STATES PATENTS

| | | | |
|---|---|---|---|
| 534,957 | 2/1895 | Ingraham | 107/19 R X |
| 2,740,349 | 4/1956 | De Gonia | 99/426 |
| 2,796,020 | 6/1957 | Olderr | 107/19 R X |
| 2,967,474 | 1/1961 | Ford | 99/426 |
| 3,424,076 | 1/1969 | Bernatz et al. | 99/426 X |

Primary Examiner—Price C. Faw, Jr.
Attorney—Buckhorn, Blore, Klarquist and Sparkman

[57] ABSTRACT

A taco is manufactured from a tortilla cake in an apparatus which folds the tortilla cake between a male member shaped substantially like the desired finished taco and a female member which closes thereagainst providing a centrally creased taco having angularly related sides. At the end of such crease, end forming members move angularly upwardly against the end portions of the tortilla cake to form end gussets gathered between the sides of the taco as end folds or pleats. These end gusset portions are desirably somewhat thicker than the remainder of the taco to avoid cracking.

15 Claims, 19 Drawing Figures

PATENTED APR 4 1972

ROGER H. HANSON
INVENTOR
BY
BUCKHORN, BLORE, KLARQUIST & SPARKMAN
ATTORNEYS

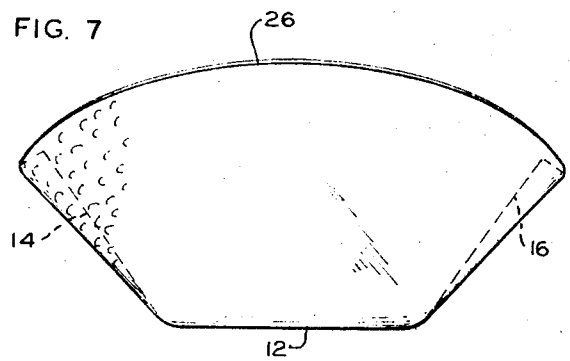
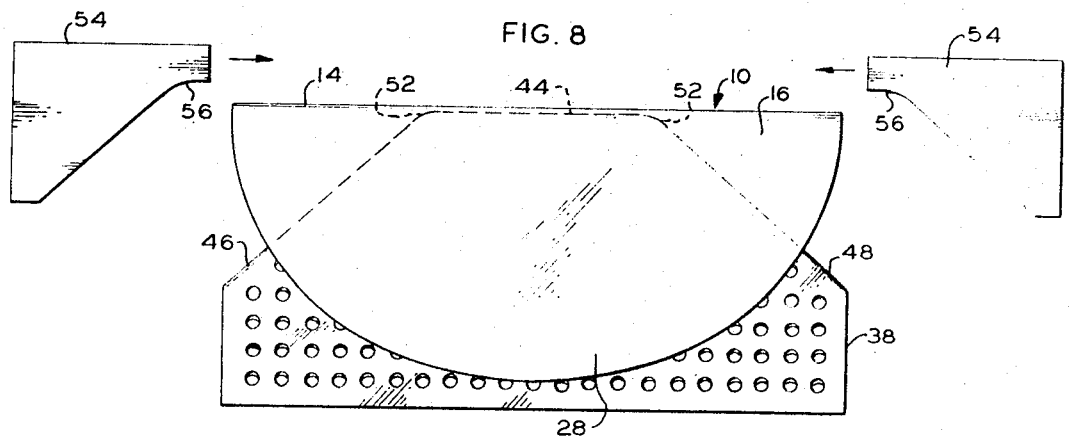
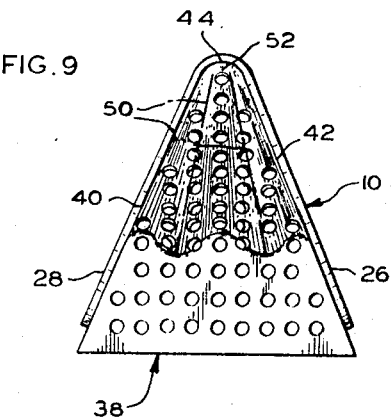
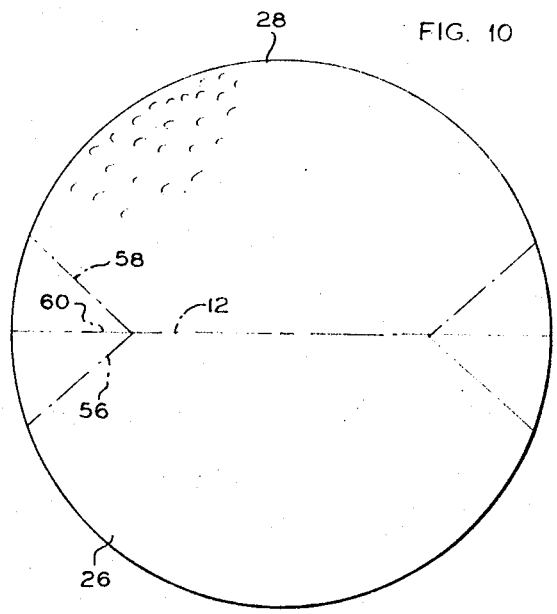

ROGER H. HANSON
INVENTOR

BY
BUCKHORN, BLORE, KLARQUIST & SPARKMAN
ATTORNEYS 3,653,337

FOOD COOKING APPARATUS

CROSS-REFERENCE TO RELATED APPLICATION

This application is a continuation-in-part of my application Ser. No. 659,634, filed Aug. 10, 1967, entitled "Taco and Manufacture Thereof," now abandoned.

BACKGROUND OF THE INVENTION

Tacos are normally formed as a kind of a sandwich from a flat tortilla which is folded over to contain the taco filling therewith. The ends of the sandwich are conventionally open, making possible loss of the filling, and causing the taco to be somewhat awkward to eat. The filling must have at least a consistency which has a limited tendency to flow from the ends of the sandwich.

One conventional apparatus for forming tacos includes male and female members between which a tortilla cake is placed and formed into a desired V-shape The tortilla cake is carried between such male and female members through a tank of heated cooking oil in which the taco is cooked.

SUMMARY OF THE INVENTION

In accordance with the present invention, a tortilla cake is formed between male and female members for carrying the tortilla cake through heated cooking oil while providing the desired taco shape. The female member comprises sides or leaves which are folded together against the male member with the tortilla cake therebetween, for folding or creasing the tortilla cake. Substantially concurrently with the folding of the sides or leaves of the female member, end forming members are raised upwardly toward creased ends of the male member for providing end gusset portions in the finished taco. The resulting gusset portions, which are gathered between the sides of the taco, extend substantially from the location of the longitudinal crease or fold in the taco toward the taco's top opening. The resultant taco can be conveniently held in the hand, with the crease thereof fitting across the palm of the hand without the loss of filling material from the ends of the taco.

It is accordingly an object of the present invention to provide an improved taco cup or receptacle suitable for holding in the hand without loss of filler material.

It is another object of the present invention to provide an improved method and means for forming tacos.

It is another object of the present invention to provide improved apparatus comprising means for urging a tortilla cake into a desired taco form.

It is a further object of the present invention to provide an improved taco which may be held within the hand without loss of filler material, wherein such taco is formed from a flat tortilla cake.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 7 is a side view of a taco formed according to the present invention;

FIG. 8 is a side view of apparatus for forming a taco according to the present invention and is illustrative of a method step employed in forming such taco;

FIG. 9 is an end view of a central portion of the FIG. 8 apparatus;

FIG. 10 is a top view of a tortilla cake which may be formed in an alternative manner to provide a taco according to the present invention;

DETAILED DESCRIPTION

Figure 1:
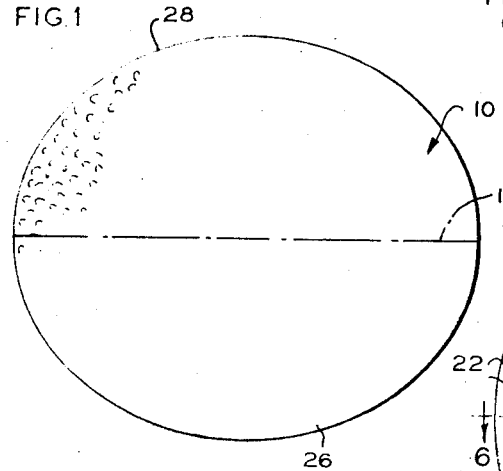
FIG. 1 is a top view of a tortilla cake employed in the manufacture of a taco according to the present invention.

Referring to the drawings, FIG. 1 illustrates an initially formed, substantially planar, tortilla cake 10 which may be rolled from masa dough and which is preferably oval or oblong in shape, having a longer central axis 12. The tortilla cake is cooked in the usual manner at least to a partial extent. Such a tortilla cake is also illustrated in FIG. 2 wherein certain construction lines are superimposed thereon to aid in the understanding of the formation of a taco according to the present invention.

Figure 2:
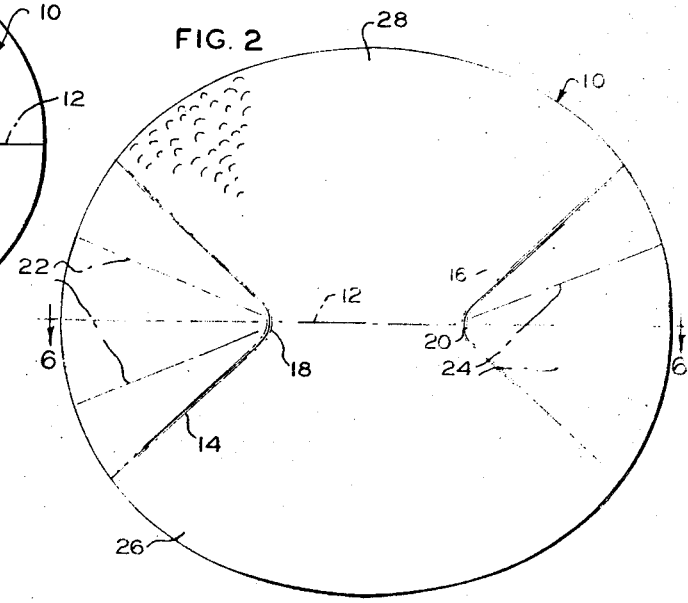
FIG. 2 is a top view of the same tortilla cake having certain fold lines indicated thereon.

FIG. 2 is also illustrative of a preferred form of the present invention wherein the tortilla cake is initially rolled is provided with two sector-like end portions 14 and 16 of greater thickness than the remainder of the tortilla cake, e.g., by rolling the tortilla with a conversely shaped roller mechanism. This added thickness is more fully illustrated in the FIG. 6 cross section. The sector-like end portions are spaced from one another along center line 12 at opposite ends of the tortilla cake, and extend inwardly toward one another, having aligned vertices 18 and 20 which are preferably rounded and which substantially coincide with the center line. Ray-like construction lines 22 and 24 denote the locations of flutes or folds in the finished taco as hereinafter more fully described.

Figure 3:
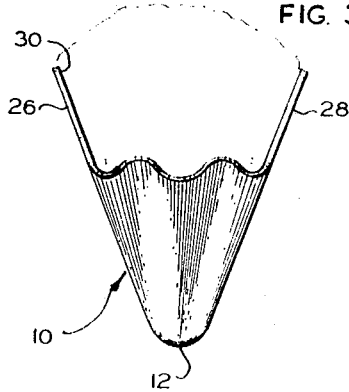
FIG. 3 is an end view of a taco according to the present invention.
Figure 5:
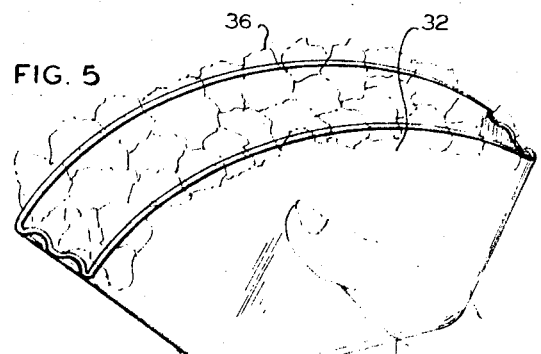
FIG. 5 is a perspective view of a taco according to the present invention as conveniently supported in the palm of the hand.
Figure 4:
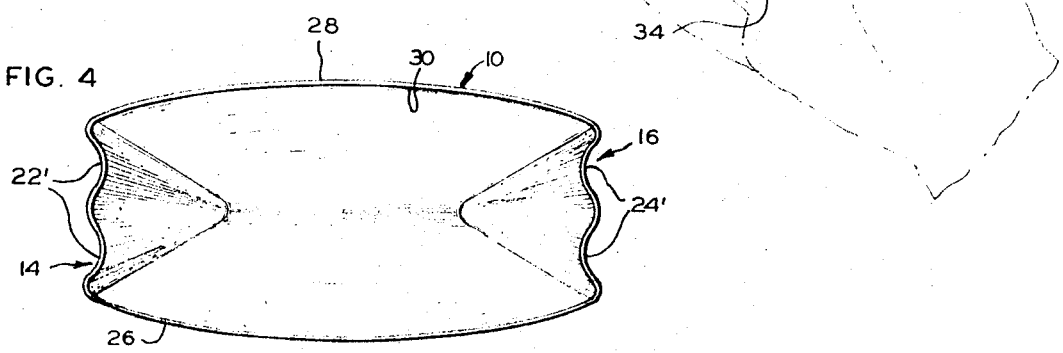
FIG. 4 is a top view of such taco.

In forming the taco according to the present invention, a tortilla cake such as indicated in FIGS. 1 or 2, and which is at least partially cooked, is folded along a fold line or crease at center line 12 so that substantially planar sides 26 and 28 are angularly and upwardly disposed towards a top edge defining an opening 30 as indicated in FIG. 3. As illustrated in FIG. 3, the fold at center line 12 is preferably trough-shaped or arc-shaped in cross section whereby the tortilla cake is less likely to crack in forming, and whereby a taco receptacle of greater food holding capacity is provided. The end portions 14 and 16 are then urged upwardly toward the top opening 30 and toward one another as illustrated in the FIG. 4 top view. The end portions are bent or urged in this manner angularly away from center line 12 and are gathered as they are urged upwardly so as to provide pleats or folds 22' and 24' substantially at locations of the similarly numbered construction lines as illustrated in FIG. 2. These folds or pleats extend substantially from the location of the crease at center line 12 in a direction toward top opening 30. The end portions of the tortilla cake are gathered in this manner, substantially between the sides 26 and 28 as illustrated by dotted lines in FIG. 7. The end portions are thus accommodated in a small space while providing ample end walls or gussets to prevent the loss of filler material from the ends of the taco receptacle when the taco is held in the hand as illustrated at 32 in FIG. 5. It is noted the lower crease, here illustrated at 34, conveniently fits between thumb and forefinger and along the palm of the hand so that the taco can be conveniently held for eating in an upright position, the taco being provided with edible filler material 36 therewithin.

It is not entirely necessary that end portions 14 and 16 have greater thickness than the remainder of tortilla cake 10, but it has been found highly desirable and preferable that this be the case. Then, when the taco is formed, such end portions are much less likely to crack and form undesired openings in the finished receptacle. It should also be noted that the initial contour of the tortilla cake 10 may be round, or may take some other shape, but the described oval shape has been found most adaptable for the finished taco receptacle of pleasing configuration and capacity to hold a maximum quantity of filler material.

The taco according to the present invention is advantageously manufactured employing apparatus illustrated in FIGS. 8 and 9. Referring to FIG. 8 and 9, a first form 38, which may be metal, is provided with an external shape substantially similar to that of the desired taco. That is, form 38 is provided with angularly related walls 40 and 42 which meet in an arc-shaped top ridge 44. The walls are preferably planar, and are perforated so as to allow the passage of cooking oil therethrough. The form 38 is also provided with end portions 46 and 48 inclined downwardly from ridge 44 at approximately the same angle, and each being provided with outer flutes 50 extending ray-like along said end portions from locations 52 proximate ends of the ridge 44 toward the lower portion or base of form 38. These flutes, 50, are adapted to form the desired pleats or folds 22' and 24' in the ends of the taco as hereinbefore described.

The apparatus further comprises a pair of fluted female die members 54 provided with inner flutes having a matching reverse pattern to the outer flutes 50 on the end portions of form 38. These female die members are employed as hereinafter described for pressing end portions of a tortilla cake downwardly from ridge 44 and upon the end portions of form 38 so as to shape the end or gusset portions of the taco.

In manufacturing a taco according to the present invention, a tortilla cake 10, such as illustrated in FIG. 1, and which has been at least partially cooked, is positioned on form 38 with its center line 12 aligned substantially along ridge 44. The tortilla cake sides 26 and 28 are urged against the walls 40 and 42 of form 38. Then, the female die members 54 are urged respectively towards one another and downwardly against end portions 14 and 16 to provide the desired folded or pleated end pattern between the sides of the taco as hereinbefore described. It is again pointed out that end portions 14 and 16 should desirably be of greater thickness so as to avoid cracking of the tortilla cake at this stage. Furthermore, locations 52 proximate the ends of ridge 44 are desirably convexly rounded whereby to smoothly contact the corners of the tortilla cake and avoid cracking. Female die members 54 are also curved concavely at 56 in order to match the convexly curved locations 52.

The manufacturing operation, including the urging of tortilla cake 10 against form 38 and the application of female die members 54 in order to press the end portions inwardly, is preferably carried out with the form 38 carrying the tortilla cake immersed in hot cooking oil. The cooking oil is raised to the proper temperature to deep fry the tortilla cake substantially immediately after or during the shaping thereof into the desired configuration. If form 38 is immersed in oil, sides 26 and 28 of the tortilla cake may be urged downwardly against form 38 by any convenient means such as a trough-shaped member matching the outside of the cake. Then, female die members 54 are applied. This procedure, as carried out within the cooking oil, may suitably be mechanized whereby the taco and forms are brought into contact automatically. Of course, one or more forms may be disposed in the same cooking oil bath at the same time.

The particular form of the pleats or folds 22' and 24' in the end portions or gussets of the taco cup, as hereinbefore described, is not to be construed as the only form which these pleats or folds may take. Thus, instead of a plurality of folds as hereinbefore illustrated, there may be only one inwardly directed fold. A tortilla cake which may be formed into a taco of the latter description is illustrated in FIG. 10. In FIG. 10, construction lines 58 and 60 illustrate the form the end portion may take. It will be seen that a single inwardly directed fold or pleat at 60 can then be utilized instead of a plurality of folds or pleats. Alternatively a greater number of folds may be employed than the number illustrated in the first embodiment. Moreover, a pair of folds or pleats may be formed at each end of center line 12 with each such fold or pleat being located more closely against sides 26 and 28 of the finished taco whereby the end gussets of the finished taco therebetween may then appear to be substantially flat. Many similar variations are possible.

Figure 11:
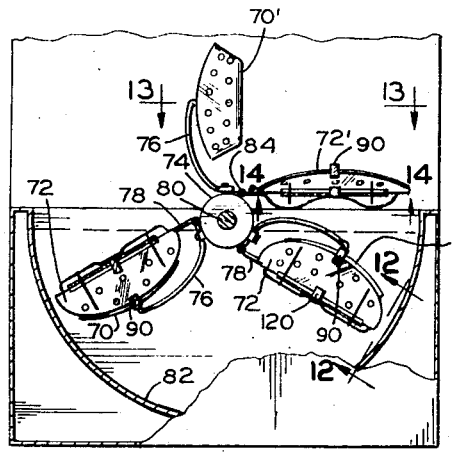
FIG. 11 is a cross-sectional view of a taco cooking apparatus.
Figure 12:
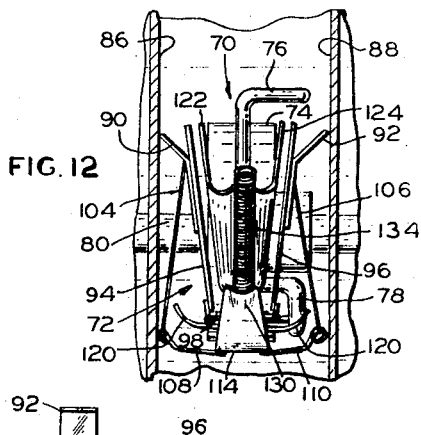
FIG. 12 is a partial cross-sectional view taken at 12—12 in FIG. 11.
Figure 13:
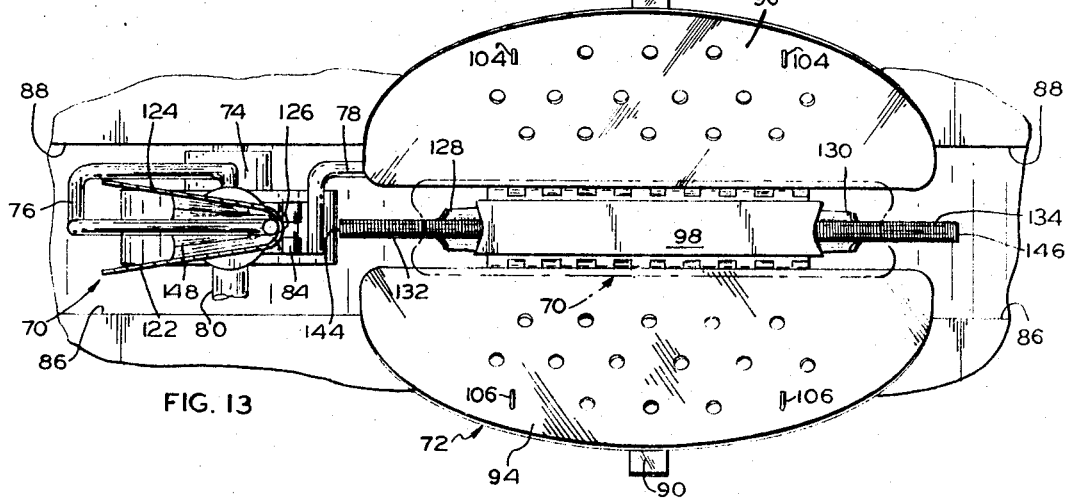
FIG. 13 is a partial top view of cooking apparatus according to the present invention taken at 13—13 in FIG. 11.
Figure 14:
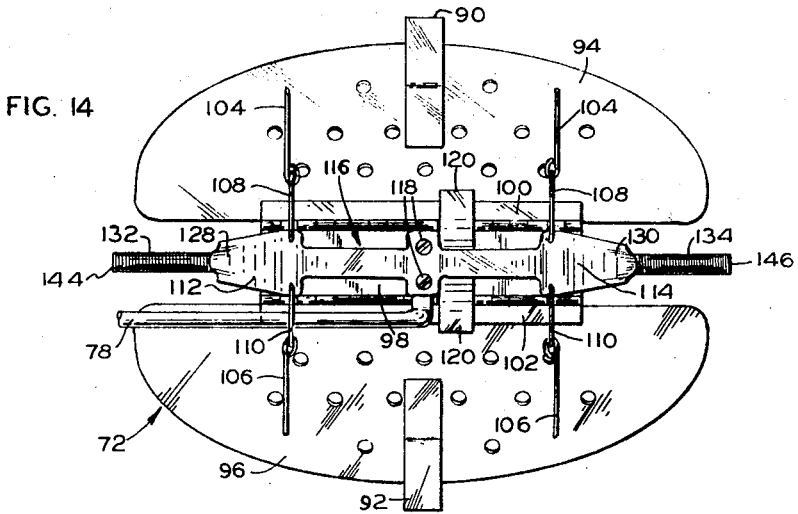
FIG. 14 is a partial bottom view of a female forming member, such view being taken at 14—14 in FIG. 11.
Figure 15:
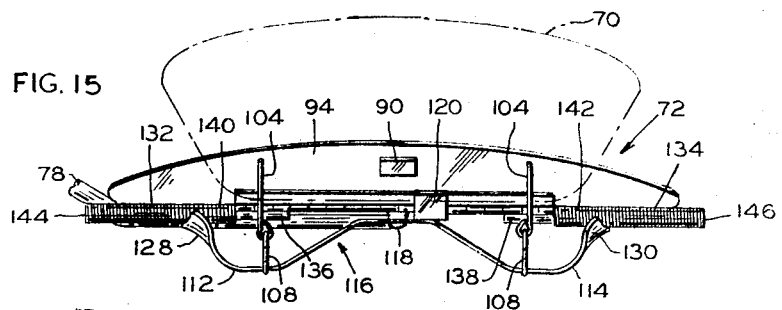
FIG. 15 is a side view of the FIG. 14 female forming member illustrating the female member in a normal open position, and in a closed position as shown in dashed lines.

Now, referring to FIGS. 11 through 17, a preferred form of cooking apparatus is illustrated. The general configuration of the apparatus as illustrated in FIG. 11 for cooking V-shaped tacos is known. A plurality of male members 70 and female members 72 are supported for rotation from hub 74 by means of rods 76 and 78, respectively. The hub 74 is fixed to shaft 80 extending transversely through a tank 82 adapted for containing heated cooking oil. The shaft is rotated by means, not shown, for successively passing the female and male members through tank 82 in a clockwise direction, with each pair of members holding a tortilla cake therebetween. For example, a tortilla cake is placed upon a particular female member 72' hingedly attached to hub 74 by means of hinge 84. As the hub 74 rotates in a clockwise direction, the female member 72' encounters the walls 86 and 88 of tank 82, more particularly illustrated in FIG. 12. Tabs 90 and 92 engage the walls of the tank forcing the sides of the female member 72' together, as the hub 74 rotates relative to the female member 72' in a clockwise direction. The female member 72' will then hold the tortilla cake against the sides of male members 70' providing a creased tortilla cake which is raised to a high temperature for cooking thereof by the oil tank 82. According to the present invention, means are provided for additionally gathering end gusset portions of the tortilla cake inwardly between the angularly disposed sides of the tortilla cake.

Considering the apparatus in greater detail in FIGS. 12 through 17, a female member comprises sides or leaves 94 and 96 hingedly connected to a longitudinal base plate 98 by means of the hinges 100 and 102 to which the respective leaves are secured. Each of the leaves 94 and 96 suitably comprise a semi-eliptical flat plate representing half of an ellipse severed and hinged along its major axis for together accommodating an oval or oblong tortilla cake. The leaves are also perforated as shown for the passage of cooking oil.

According to the present invention, the leaves 94 and 96 are attached near their outer edge by means of wires 104 and 106 to outriggers 108 and 110, respectively, which extend transversely from end portions 112 and 114 of a tension plate 116. The tension plate 116 which is formed of spring steel or the like, is secured with screws 118 to the bottom of plate 98, and this tension plate normally bows downwardly at the enlarged end portions 112 and 114 as illustrated more clearly in FIG. 15. The tension plate thus normally urges leaves 94 and 96 into a downward or semi-flat position against stops 120 secured to the underside of plate 98. The tension plate 116 maintains the female member 72 in an open configuration until tabs 90 and 92 engage the sides 86 and 88 of the tank 82 as illustrated by dashed lines in FIG. 16. Then, the sides 94 and 96 of the female member 72 draw up enlarged portions 112 and 114 of tension plate 116 via wires 104 and 106. Of course, as the sides of the female member are cammed inwardly toward one another by sides of the tank, the friction encountered by tabs 90 and 92 with walls 86 and 88 holds the female member in position until male member 70 urges the female member in a clockwise direction through tank 82. Sides 122 and 124 of male member 70 become juxtaposed respectively with leaves 94 and 96 for the purpose of holding and forming a tortilla cake therebetween, providing the shape of a taco. Sides 122 and 124 of male member 70 are angularly divergent and join at arc-shaped apex 126 for forming the arc-shaped or trough-shaped fold or crease in the taco.

Figure 17:
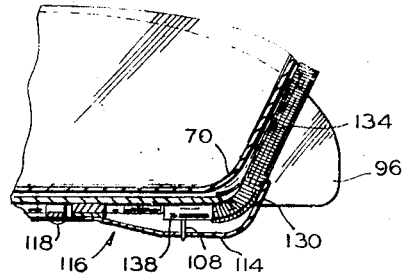
FIG. 17 is a detail cross-sectional view taken at 17—17 in FIG. 16 illustrating operation of end forming members according to the present invention.

The enlarged end portions 112 and 114 of tension plate 116 are upturned at their extremities to provide operators 128 and 130 bearing upon tubular end forming members 132 and 134, respectively. The tubular end forming members are suitably tightly coiled springs normally extending horizontally from the ends of base plate 98. Thus, end forming member 132 extends from a rod 136 secured underneath a first end of base plate 98 while second end forming member 134 extends in the opposite direction from a rod 138 secured to the underside of base plate 98 at the opposite end of the base plate. The end forming members 132 and 134 need not be springs, but are preferably tubular and are normally tensioned for assuming the horizontal position illustrated in FIG. 15. When the members 132 and 134 are springs, the springs are hollow at locations 140 and 142 so as to flex in this region, but are desirably plugged beyond locations 140 and 142 toward their ends 144 and 146, whereby the flexure predominantly takes plate only at locations 140 and 142. Operators 128 and 130 contact members 132 and 134 slightly towards ends 144 and 146 from the locations 140 and 142, and are curved as shown to fit the outer contour of members 132 and 134. When leaves 94 and 96 fold upwardly toward male member 70, pulling tension plate 116 upwardly therewith, operators 128 and 130 cause end forming members 132 and 134 to move angularly upwardly against the end of male member 70 as illustrated in FIG. 17. The springs comprising members 132 and 134 are normally stiff enough to resist the upward urging of tension plate 116, and as a matter of fact, these members 132 and 134 are normally effective for holding down the leaves 94 and 96 of the female member through the linkage including tension plate 116 and wires 104, 106.

Figure 16:
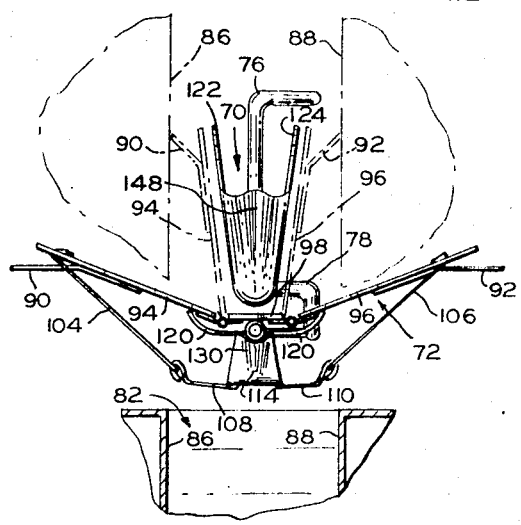
FIG. 16 is an end view of male and female members comprising taco forming apparatus according to the present invention, wherein the female member is shown in a closed position by dashed lines.

Male member 70 is creased reentrantly as illustrated at 148 in FIG. 16 for the shaping of the taco end gusset when member 134 fits into the crease. The crease in the end of the male member, that is crease 148, concurrently receives end forming member 134 therealong as member 134 is urged angularly upwardly by operator 130. The male member 70 is in general formed at its ends in a manner for contouring the ends of the finished taco. I.E., the location proximate the ends of the apex ridge of the male member are desirably convexly rounded whereby to smoothly contact the tortilla cake and avoid cracking (where crease 148 starts). The crease 148, together with an end forming member 134 produces a single reentrant pleat or fold in the end of the taco. Although the operation of the end forming members has been principally explained with reference to end forming member 134, it is appreciated that end forming member 132 operates in a substantially identical manner.

Figure 6:
FIG. 6 is a cross section of the tortilla cake taken at 6—6 in FIG. 2.

When a tortilla cake is employed having end portions of greater thickness, as illustrated in FIG. 6, the tortilla cake is, of course, initially placed on the female member so that the thicker end portions will engage the end forming members 132 and 134 with proposed crease line between the end portions disposed along the length of base plate 98. Whether or not a tortilla cake with thicker end portions is employed, with an oval or oblong shaped tortilla cake, the long axis of the oval is similarly disposed along base plate 98 when a tortilla cake is initially placed in the apparatus.

Figure 18:
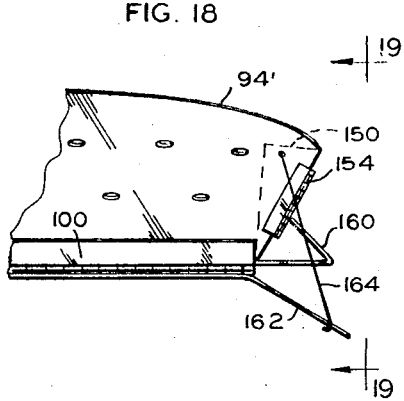
FIG. 18 is a partial side view of an alternative female member according to the present invention.
Figure 19:
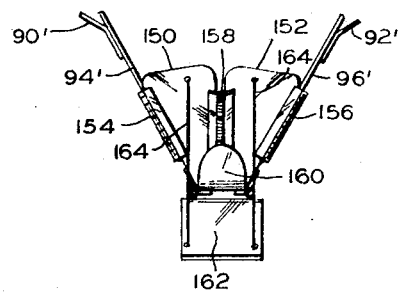
FIG. 19 is an end view of the FIG. 18 female member.

The above apparatus is preferred for the formation of a taco with end gusset portions because of the simplicity and dependable operation thereof. However, it will be readily appreciated that similar mechanisms can be employed for the end forming members. Thus, referring to the embodiment of FIGS. 18 and 19, a female member is illustrated which may alternatively be employed in place of the female member 72 illustrated in FIGS. 12 through 17. In FIGS. 18 and 19, similar elements are referred to employing primed reference numerals. In the embodiments of FIGS. 18 and 19 the end forming members each comprise a pair of hinged plates 150 and 152. Plate 150 is connected by means of a hinge 154 to an angularly upwardly extending end edge of leaf 94', while plate 152 is connected by means of a similar hinge 156 to angularly upwardly extending end edge of leaf 96'. The plates 150 and 152 are also joined therebetween with hinge 158, and this location will be operative for urging end gussets formed in the tortilla cake toward crease 148 in the end of male member 70 as was illustrated in FIG. 16. Each of the plates 150 and 152 is semi-triangular in shape, and when these plates are in nearly coplanar alignment, leaves 94' and 96' are allowed to open to their maximum extent for the reception of a tortilla cake.

The female member of FIGS. 18 and 19 is further provided at either end with a stop 160 which prevents plates 150 and 152 from assuming an entirely coplanar relationship. Thus, stop 160 extends inwardly between leaves 94' and 96' just slightly beyond the ends thereof whereby improper outward bowing of plates 150 and 152 is prevented. A flexible tension plate 162 also extends from either end of the base plate, and near the end thereof wires 164 are attached which connect to plates 150 and 152 near their upper extremities proximate hinge 158. Tension plate 162 normally urges the plates 150 and 152 toward a more coplanar position thereby forcing apart leaves 94' and 96'. However, when the female member is operative in apparatus such as illustrated in FIG. 11, tabs 90' and 92' contact the sides of the tank 82 forcing leaves 94' and 96' together in a manner similar to that described in connection with the previous embodiment. At this time, plates 150 and 152 force hinge 158 angularly upwardly toward the crease 148 in a male member 70 as hereinbefore described.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. Apparatus for forming a taco receptacle comprising: juxtaposition a male member and a female member adapted to receive a relatively flat tortilla cake therebetween which is to be formed into a taco receptacle, said male member having substantially flat sides joined at a crease for forming the crease of said taco receptacle, said male member being reentrantly indented on the ends thereof, said female member also having flat sides adapted for justaposition with the flat sides of said male member for holding said taco receptacle therebetween, and end means positioned at either end of said male and female members and adapted for movement relative to said male member for gathering inwardly and reentrantly toward the reentrant ends of said male member the end portions of said tortilla cake which are separated along the taco crease to form end gussets for said taco receptacle in matching relation to the reentrant indentations of said ends of said male member.

2. The apparatus according to claim 1 wherein said end means are tubular and wherein means are provided for operating said end members toward ends of said male member as the sides of said female member are closed toward the sides of said male member, said tubular end means moving angularly upwardly toward a more vertical position and into reception in the reentrant indentations of said male member.

3. Apparatus for forming a taco receptacle comprising:

a male member and a female member adapted to receive a tortilla cake therebetween which is to be formed into a taco receptacle, said male member having substantially flat sides joined at a crease for forming the crease of said taco receptacle, said female member also having flat sides adapted for juxtaposition with the flat sides of said male member for holding said taco receptacle therebetween, and end means positioned at either end of said male and female members for gathering inwardly toward the ends of said male member the end portions of said tortilla cake which are separated along the taco crease to form end gussets for said taco receptacle, said end means being tubular and normally tensioned in a position away from the ends of said male member, said apparatus further including means for normally opening the sides of said female member for the reception of a tortilla cake, said last mentioned means being responsive to closure of the sides of said female member for also operating said end means toward the ends of said male member.

4. The apparatus according to claim 3 wherein said means for normally opening the sides of said female member comprises a tension plate connected to said female member and for operating means for urging said end means upwardly when the sides of said female member close.

5. The apparatus according to claim 4 wherein each tubular end means comprises a spring urged upwardly by operation of said tension plate.

6. The apparatus according to claim 1 wherein said end means each comprise a pair of plates hingedly connected to each other and to ends of the flat sides of said female member positioned for folding inwardly toward the end of said male member when the sides of said female member become juxtaposed with respect to the sides of said male member.

7. Apparatus for forming a taco receptacle comprising:
first and second members between which a tortilla cake is receivable,
the first member comprising a pair of leaves hingedly related for closure toward one another,
the second member being shaped for reception between said leaves toward which said leaves close for forming a creased taco from a tortilla cake placed between said first and second members,
end element means positioned at either end of the second member as received between said leaves substantially in line with the crease in the taco for gathering end gussets of said tortilla cake toward ends of said second member,
and means for moving the said end element means toward said second member as the leaves of the first member close toward the second member.

8. The apparatus according to claim 7 wherein said means for moving said end element means comprises a tension plate connected by wires to said leaves and adapted for forcing said end element means angularly upwardly as said leaves close toward said second member.

9. The apparatus according to claim 8 wherein said end element means are tubular and are tensioned normally to resist action of said tension plate.

10. The apparatus according to claim 9 wherein said first and second members are extended from a rotatable hub, and further including a tank for receiving said members as said hub rotates, said first member being hingedly connected to said hub and positioned for engagement of the leaves thereof with the sides of said tank as said hub rotates for bringing about relative rotation between said first member with respect to said hub and said second member as well as closure of said leaves toward one another.

11. Means for manufacturing a taco cup receptacle comprising a first form having substantially planar walls angularly inclined and joining in an arc-shaped ridge, said first form having spaced end portions inclined away from said ridge at either end of said ridge at approximately the same angle, said end portions each being provided with at least one flute extending ray-like along said end portions from locations proximate each end of said ridge, and a pair of fluted female die members for matching the flutes in the end portions of said first form and adapted for compressing the ends of a tortilla cake against the end portions of said first form.

12. The apparatus according to claim 11 wherein said first form is provided with perforations through which cooking oil may pass.

13. Apparatus for forming a taco receptacle comprising:
a male member adapted to receive a relatively flat tortilla cake in wrapped relation thereupon for forming the same into a taco receptacle, said male member having angularly related substantially flat sides joined at a crease for forming a crease in the taco receptacle, said male member having reentrant indentations on the ends thereof for receiving folded down end portions forming pleats in the finished receptacle, said indentations extending along the end portions from locations proximate each end of said crease, end means in spaced relation to either end of said male member and adapted for reception within the end reentrant indentation of said male member, and means for causing relative movement between said end means and said male member for causing said end means to be received into said reentrant indentations for forming reentrant end pleats in said tortilla cake located therebetween.

14. Apparatus for forming a taco receptacle comprising:
a male member and a female member adapted to receive a tortilla cake therebetween which is to be formed into a taco receptacle, said male member having substantially flat sides joined at a crease for forming the crease of said taco receptacle, said female member also having flat sides adapted for juxtaposition with the flat sides of said male member for holding said taco receptacle therebetween, end means positioned at either end of said male and female members for gathering inwardly toward the ends of said male member the end portions of said tortilla cake which are separated along the taco crease to form end gussets for said taco receptacle, said end means each comprising a pair of plates hingedly connected to each other and to ends of the flat sides of said female member positioned for folding inwardly toward the end of said male member when the sides of said female member become juxtaposed with respect to the sides of said male member, and tension means for normally urging plates of said end means almost to a coplanar position.

15. Means for manufacturing a taco cup receptacle comprising a first form having substantially planar walls angularly inclined and joining in an arc-shaped ridge, said first form having spaced end portions inclined away from said ridge at either end of said ridge at approximately the same angle, said end portions each being provided with at least one flute extending ray-like along said end portions from locations proximate each end of said ridge, and a pair of mating female die members for matching the flutes in the end portions of said first form and adapted for compressing the ends of a tortilla cake against the end portions of said first form, wherein said first form at locations proximate each end of said ridge is convexly rounded from said ridge and said sides to prevent cracking of said tortilla cake.

* * * * *

UNITED STATES PATENT OFFICE
CERTIFICATE OF CORRECTION

Patent No. 3,653,337          Dated April 4, 1972

Inventor(s) ROGER H. HANSON

It is certified that error appears in the above-identified patent and that said Letters Patent are hereby corrected as shown below:

Col. 1, line 12, "therewith" should be --therewithin--

Col. 2, line 24, after "in a" insert --normally open position, and is additionally shown in a--

Col. 2, line 46, "is" should be --as-- (first occurrence)

Col. 3, line 29, "in" should be --at--

Col. 5, line 29, "plate" should be --place--

Col. 6, line 53 of claim 1, "justaposition" should be --juxtaposition--

Col. 7, line 23 of claim 5, after "each" insert --said--

Signed and sealed this 22nd day of August 1972.

(SEAL)
Attest:

EDWARD M. FLETCHER, JR.
Attesting Officer

ROBERT GOTTSCHALK
Commissioner of Patents